United States Patent
Iizuka et al.

(10) Patent No.: US 6,515,720 B1
(45) Date of Patent: Feb. 4, 2003

(54) ACTIVE MATRIX LIQUID CRYSTAL DISPLAY DEVICE

(75) Inventors: Tetsuya Iizuka, Fukaya (JP); Takafumi Nakamura, Fukaya (JP); Yasuyuki Hanazawa, Fukaya (JP); Akihiro Kaga, Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/353,605

(22) Filed: Jul. 14, 1999

(30) Foreign Application Priority Data

Jul. 14, 1998 (JP) .......................................... 10-198721
May 27, 1999 (JP) .......................................... 11-148414

(51) Int. Cl.$^7$ .......................................... G02F 1/1368
(52) U.S. Cl. .......................... 349/39; 349/43; 349/110; 349/192
(58) Field of Search ........................ 349/38, 39, 43, 349/54, 55, 110, 192, 139; 324/770; 345/93; 257/57, 72

(56) References Cited

U.S. PATENT DOCUMENTS 5,173,792 A * 12/1992 Matsueda .................... 349/54
5,691,786 A * 11/1997 Nakai .......................... 349/39
5,995,178 A * 11/1999 Fujikawa et al. ............. 349/55
6,072,559 A *  6/2000 Kanemori et al. .......... 349/192
6,191,832 B1 *  2/2001 Nakakura .................... 349/54

FOREIGN PATENT DOCUMENTS

| JP | 4-80723 | 3/1992 |
| JP | 4-278926 | 10/1992 |
| JP | 4-342234 | 11/1992 |
| JP | 6-230416 | 8/1994 |
| JP | 6-289426 | 10/1994 |

* cited by examiner

Primary Examiner—William L. Sikes
Assistant Examiner—Tai Duong
(74) Attorney, Agent, or Firm—Pillsbury Winthrop LLP

(57) ABSTRACT

A coupling line connecting a pixel electrode to a source electrode and a storage capacitance electrode includes a wiring portion which does not overlap a storage capacitance line or a storage capacitance electrode. Thus, the wiring portion is exposed when viewed from the rear side of the array substrate. Therefore, even if a short circuit occurs between the storage capacitance line and the coupling line or the storage capacitance electrode, a pixel including the short-circuit defect can be improved to a half-lighted state by radiating the laser beam to the wiring portion to electrically cut it.

6 Claims, 10 Drawing Sheets

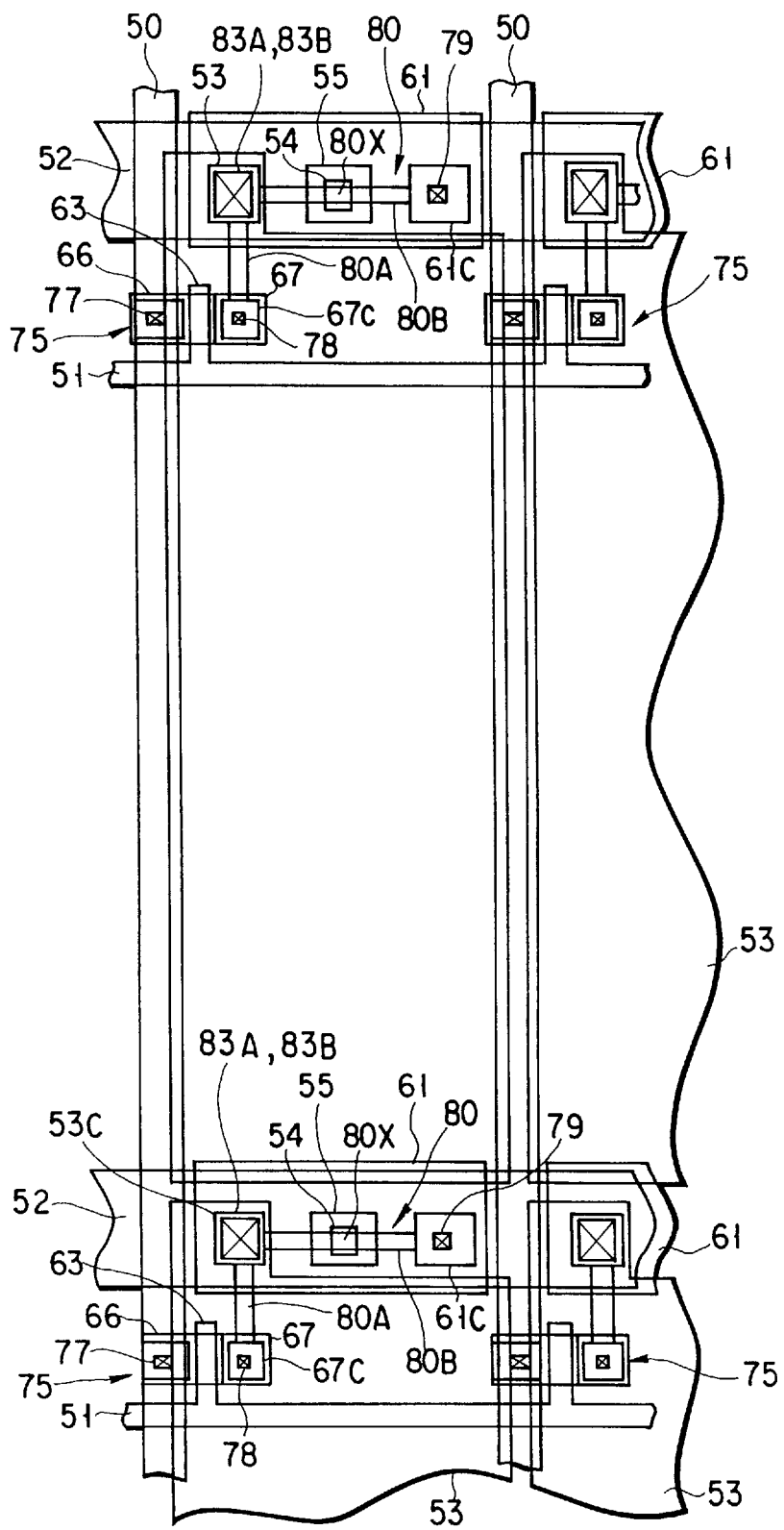
F I G. 1

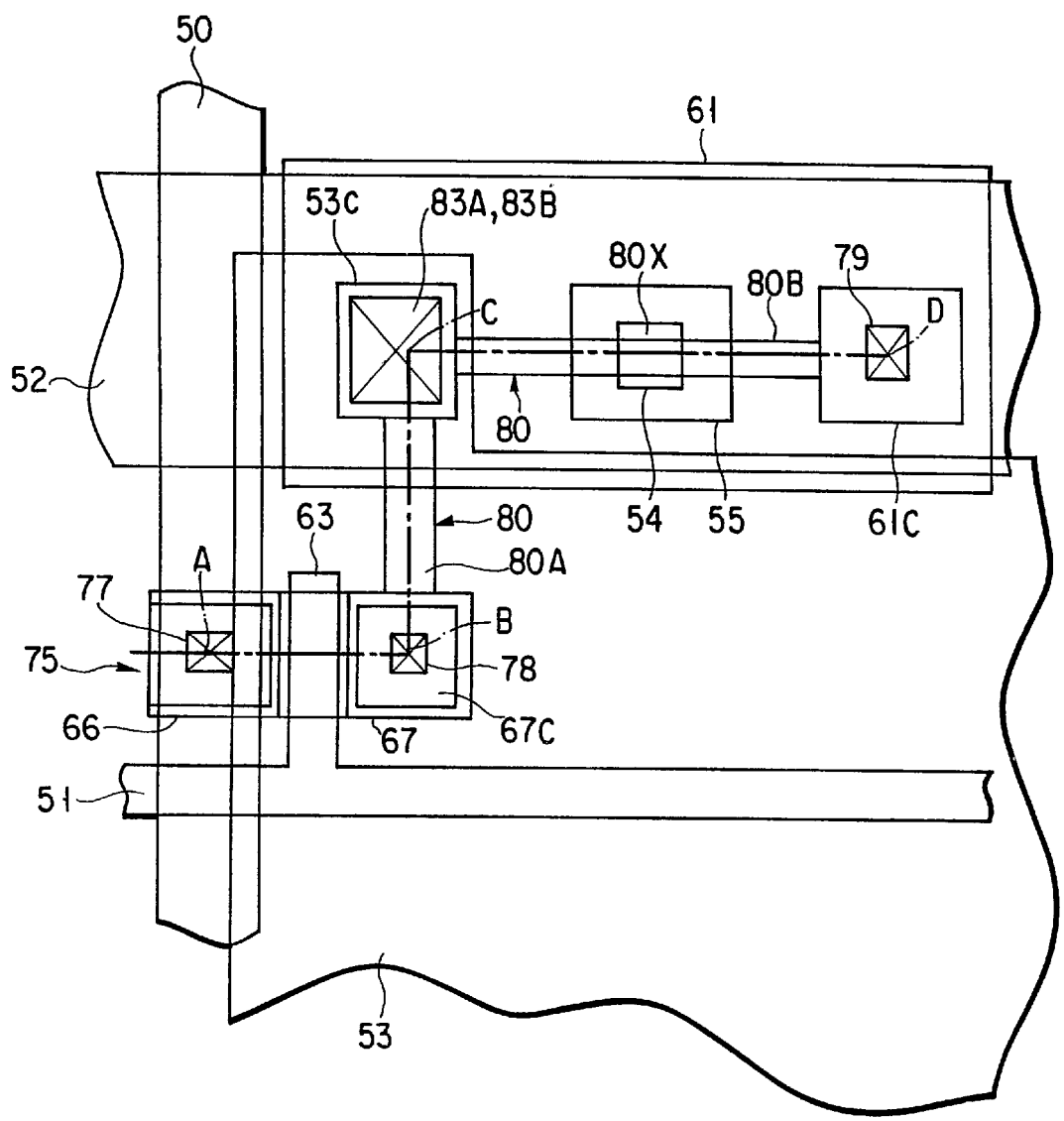
F I G. 2

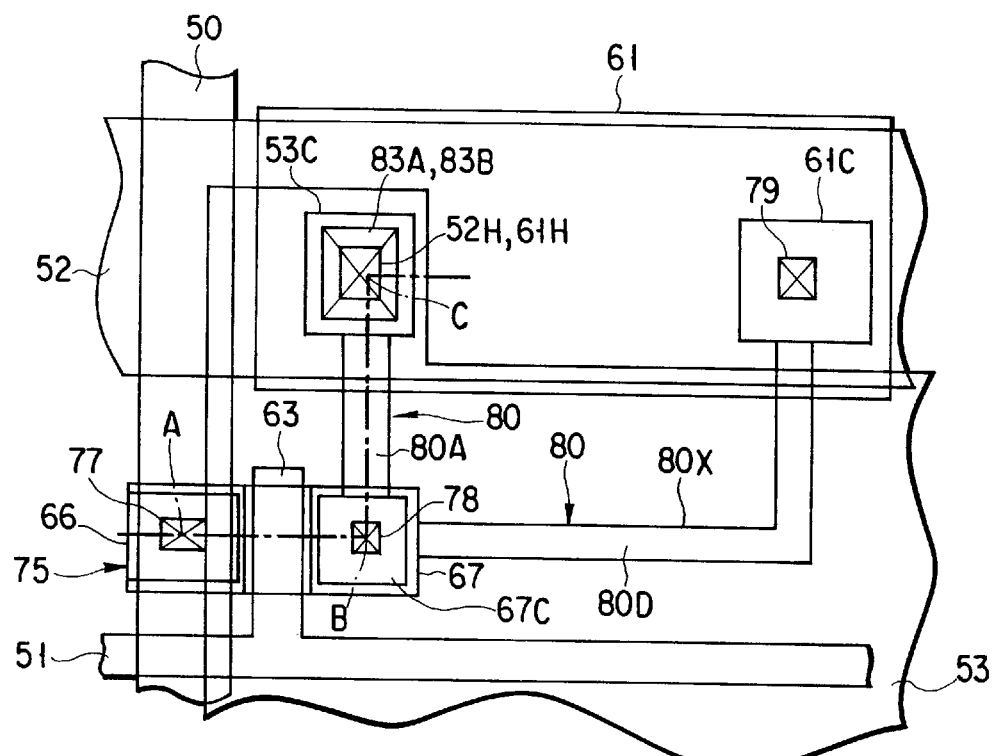
F I G. 6
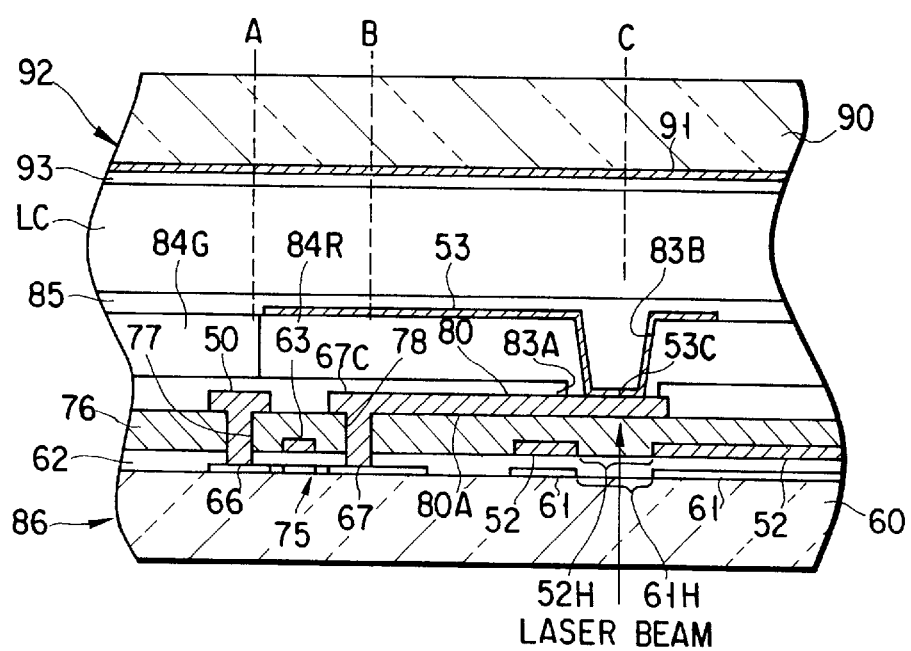
F I G. 7

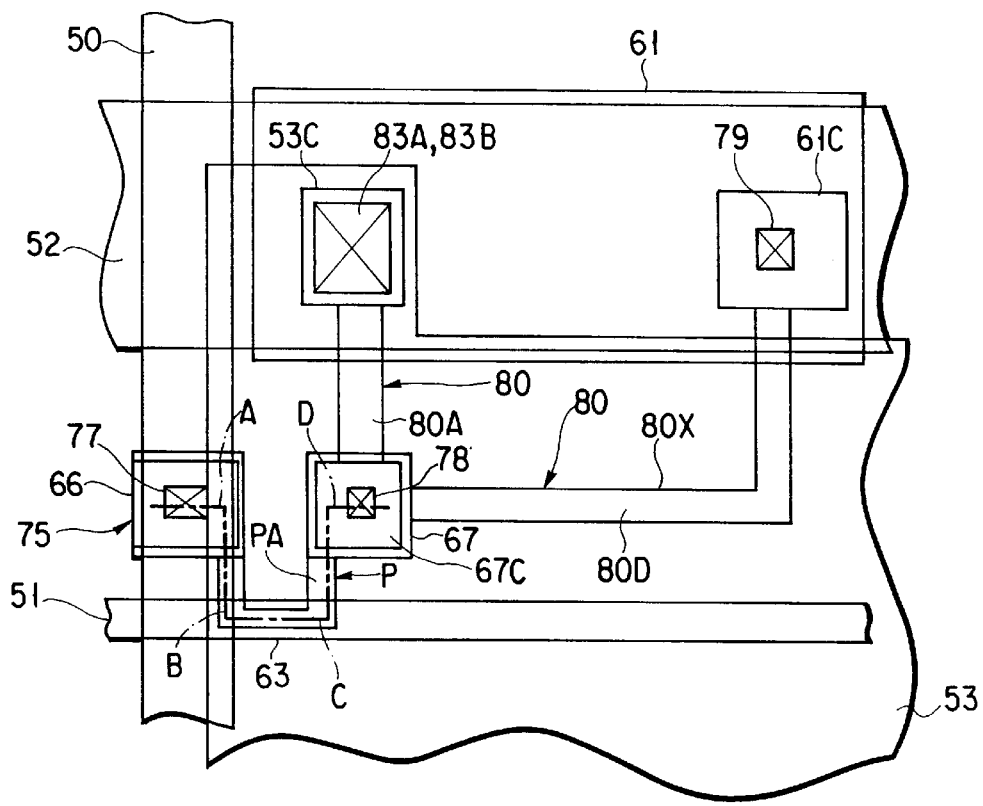
F I G. 8
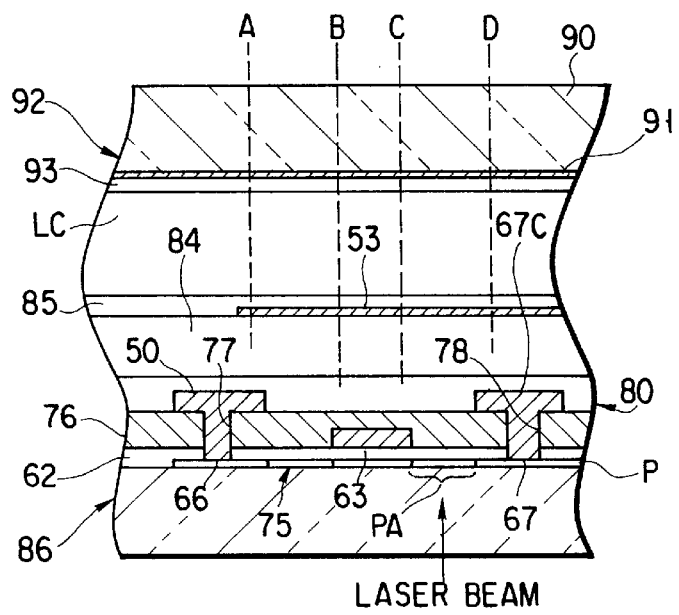
F I G. 9

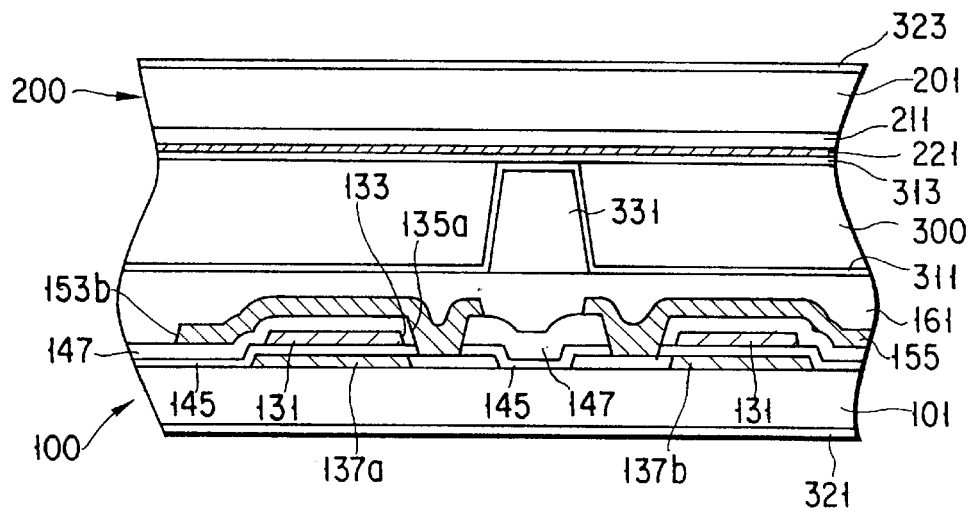
F I G. 11
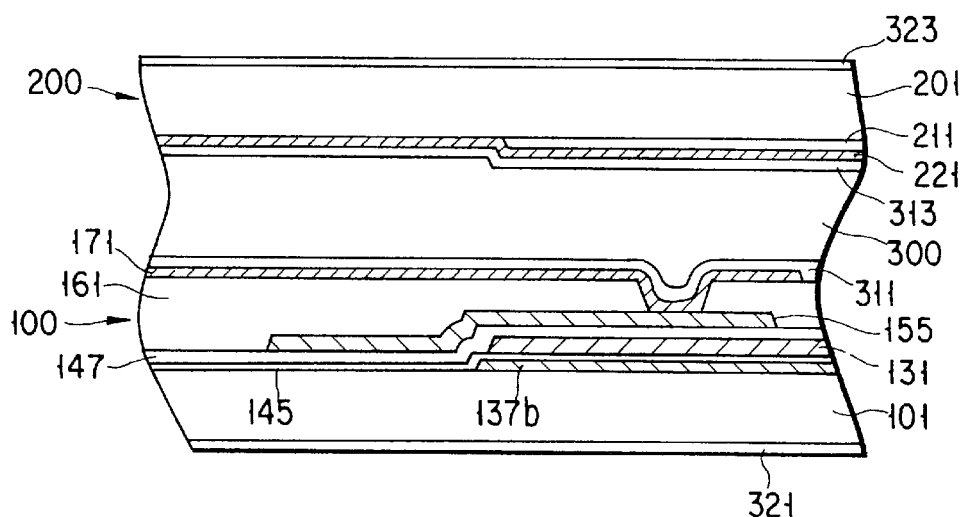
F I G. 12

ACTIVE MATRIX LIQUID CRYSTAL DISPLAY DEVICE

BACKGROUND OF THE INVENTION

The present invention relates to an active matrix liquid crystal display device, and particularly to an active matrix liquid crystal display device which has, as switching elements, thin film transistors using semiconductor layers made of polysilicon or the like.

In recent years, liquid crystal display devices have been put to practical use, which provide high-performance and high-definition display at a high density and large capacity.

Of a number of types of liquid crystal display devices, an active matrix liquid crystal display device particularly draws the public attention. This type of display device has an array substrate in which pixel electrodes, using thin film transistors (TFTs) as switching elements, are arranged in a matrix. The liquid crystal display device is advantageous in the following respects: crosstalk between adjacent pixels is small; a high-contrast image can be displayed; transmission display is possible; and the display area can be increased easily.

The array substrate applied to the active matrix liquid crystal display device includes a plurality of scanning lines and a plurality of signal lines extending in directions crossing each other on an insulating substrate. The array substrate also includes TFTs arranged near the intersections between the scanning lines and the signal lines, and pixel electrodes arranged in a plurality of regions, i.e., pixel regions, defined by the scanning lines and the signal lines.

The active matrix liquid crystal display device has a black matrix (BM) to prevent light leakage between pixel regions. The black matrix is generally arranged along with color layers serving as color filters in a counter substrate facing to the array substrate via a liquid crystal layer. Therefore, it is necessary to take account of displacement of the positions of the array substrate and the counter substrate. If the displacement occurs, the ratio of apertures which allow passage of light, i.e., the aperture ratio, is reduced.

To solve this problem, proposed in recent years is a wiring BM structure in which a light-shielding organic insulating film, serving as a black matrix, is formed on wiring portions such as the scanning lines and the signal lines in the array substrate. In the wiring BM structure, the pixel electrode is located in the uppermost layer of the pixel region, and end portions of the pixel electrode overlap the wiring portions arranged in a matrix. Another wiring BM structure is also proposed, in which, instead of the organic insulating film, color layers serving as color filters are arranged on the wiring portions, not in the counter substrate, and used as a black matrix. In these wiring BM structures, since the aperture ratio is not reduced by displacement of the array substrate and the counter substrate, a high aperture ratio is obtained.

However, the wiring BM structures described above have the following drawbacks.

In the structure wherein the wiring portions and the pixel electrodes overlap the organic insulating film or the color layers interposed therebetween, the parasitic capacitance between a signal line and a pixel electrode arranged in different layers is greater than that between a signal line and a pixel electrode arranged in the same layer with a predetermined distance. Therefore, the image quality of the liquid crystal display device is liable to be influenced by the parasitic capacitance. To prevent this, it is necessary to provide a storage capacitance fixed to a potential in all the pixel regions.

In the active matrix liquid crystal display device, hundreds of thousands to a million or more of pixel electrodes are arranged in a matrix and electrically connected to TFTs. Therefore, it is very difficult to produce all pixel regions of all array substrates without defects: that is, pixel defects occur in a certain ratio. There are various reasons for pixel defects. A defect analysis has made clear that most pixel defects are impairment due to a short circuit between electrodes constituting a storage capacitance. If such impairment occurs, the pixel is fixed to a certain potential, resulting in a defect that the pixel is always lighted. Further, since a DC voltage is continuously applied across the pixel and the counter electrode, the liquid crystal composition contained in the liquid crystal layer corresponding to the pixel region is deteriorated, with the result that the reliability is lowered.

One of the methods for repairing the pixel defects is to apply a laser beam to the storage capacitance electrode where a short-circuit defect occurs, thereby electrically cutting it from the pixel electrode. In this case, the repaired pixel is improved to a half-lighted state, although it is influenced by the parasitic capacitance between the signal line and the pixel electrode.

However, in the aforementioned wiring BM structures, if a part of the wiring portion is to be cut by a laser beam, a new short-circuit defect may occur, since the wiring portion overlaps the pixel electrode. To avoid this, if a wiring portion to be cut is formed so as not to overlap the pixel electrode, light will pass through the portion, resulting in a low contrast.

BRIEF SUMMARY OF THE INVENTION

The present invention was made to overcome the problems described above. Its object is to provide an active matrix liquid crystal display device in which a display defect can be repaired without lowering the contrast.

To achieve the above object, according to claim 1, there is provided an active matrix liquid crystal display device comprising:

an array substrate including: a scanning line; a signal line crossing the scanning line; a switching element located at an intersection between the scanning line and the signal line and electrically connected to the signal line; a pixel electrode electrically connected to the switching element through a first coupling line; a storage capacitance electrode electrically connected to one of the switching element and the pixel electrode through a second coupling line; and a storage capacitance signal line facing the storage capacitance electrode via an insulating layer; and a counter substrate having a counter electrode which faces the pixel electrode with a liquid crystal composition inserted therebetween, wherein the second coupling line includes a portion which is exposed through the storage capacitance signal line.

According to claim 7, there is provided an active matrix liquid crystal display device comprising:

an array substrate including: a scanning line; a signal line crossing the scanning line; a switching element located at an intersection between the scanning line and the signal line and electrically connected to the signal line; a pixel electrode electrically connected to the switching element through a first coupling line; a storage capacitance electrode electrically connected to the switching element through a second coupling line; and a storage capacitance signal line facing the storage capacitance electrode via an insulating layer; and a counter substrate having a counter electrode which faces the pixel electrode with a liquid crystal composition inserted therebetween, wherein the switching element includes a semiconductor layer, and a part of the semiconductor layer ranging from a channel region formed in the semiconductor layer to a connecting portion between the first and second coupling lines includes a portion which is exposed through the other lines.

According to claim 8, there is provided an active matrix liquid crystal display device comprising:

an array substrate including: a scanning line; a signal line crossing the scanning line; a switching element located at an intersection between the scanning line and the signal line and electrically connected to the signal line; a pixel electrode electrically connected to the switching element through a first coupling line; a storage capacitance electrode electrically connected to one of the switching element and the pixel electrode through a second coupling line; and a storage capacitance signal line facing the storage capacitance electrode via an insulating layer; and a counter substrate having a counter electrode which faces the pixel electrode with a liquid crystal composition inserted therebetween, wherein the storage capacitance signal line includes a first portion which overlays the storage capacitance electrode to form storage capacitance and a second portion which is exposed through the other lines.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic plan view showing a pixel region of an active matrix liquid crystal display device according to a first embodiment of the present invention;

FIG. 2 is an enlarged plan view showing a region including a coupling line of the active matrix liquid crystal display device shown in FIG. 1;

FIG. 6 is an enlarged plan view showing a region including a coupling line of an active matrix liquid crystal display device according to a fourth embodiment of the present invention;

FIG. 7 is a schematic cross-sectional view taken along the dot-chain line A-B-C in FIG. 6;

FIG. 8 is an enlarged plan view showing a region including a coupling line of an active matrix liquid crystal display device according to a fifth embodiment of the present invention;

FIG. 9 is a schematic cross-sectional view taken along the dot-chain line A-B-C-D in FIG. 8;

FIG. 11 is a schematic cross-sectional view taken along the line E–E' in FIG. 10;

FIG. 12 is a schematic cross-sectional view taken along the line F–F' in FIG. 10;

DETAILED DESCRIPTION OF THE INVENTION

Embodiments of the active matrix liquid crystal display device of the present invention will be described with reference to the accompanying drawings.

Figure 3:
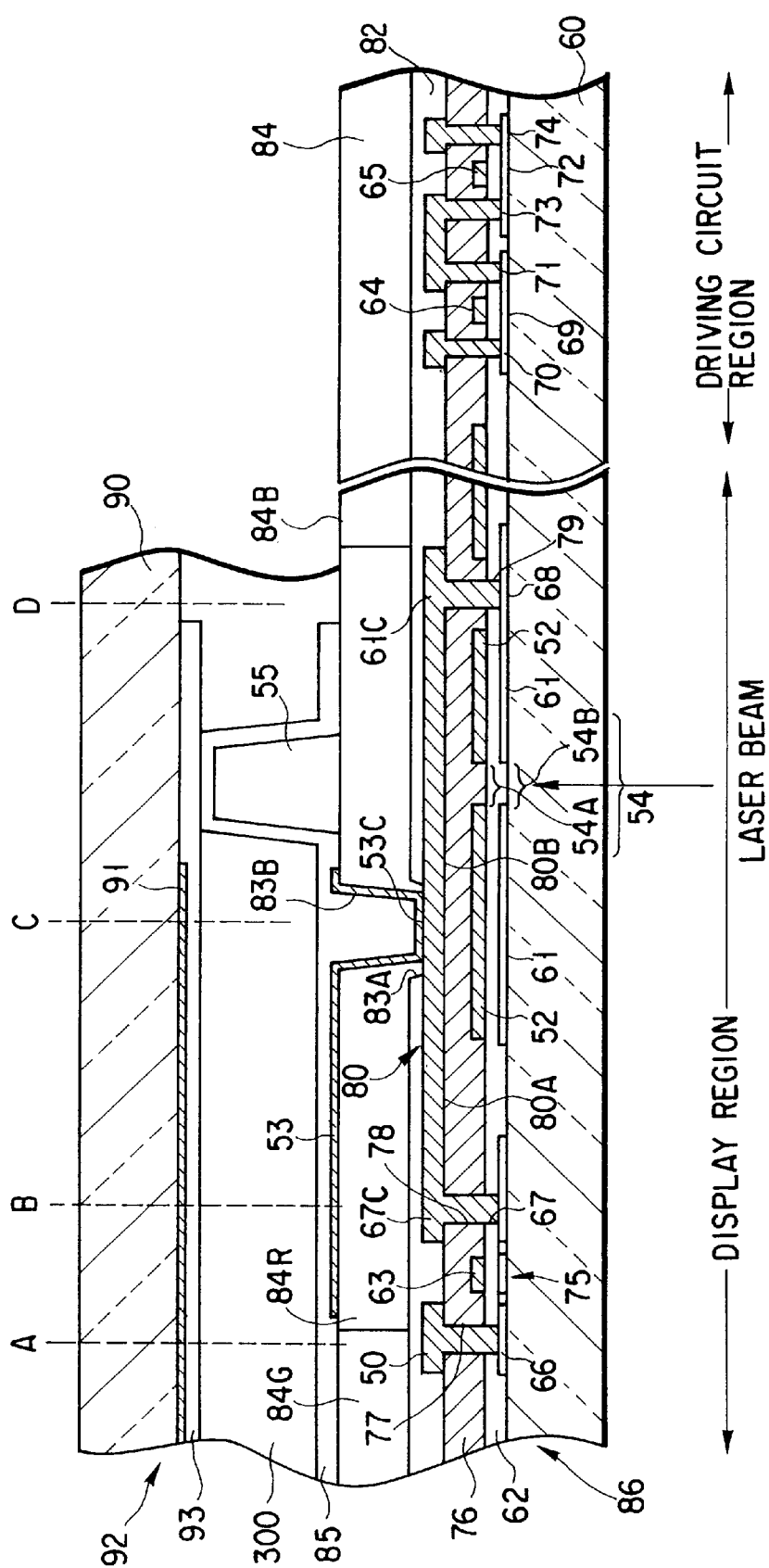
FIG. 3 is a schematic cross-sectional view taken along the dot-chain line A-B-C-D in FIG. 2.

FIG. 1 is a schematic plan view showing a pixel region of an active matrix liquid crystal display device according to a first embodiment of the present invention, and FIG. 2 is an enlarged plan view showing a region including a coupling line of the active matrix liquid crystal display device shown in FIG. 1. FIG. 3 is a schematic cross-sectional view taken along the dot-chain line A-B-C-D in FIG. 2.

As shown in FIGS. 1 to 3, in a pixel region of an array substrate 86, a signal line 50 extends at right angles with a scanning line 51 and a storage capacitance line 52 (a storage capacitance signal line) via an interlayer insulating film 76. The storage capacitance line 52 and the scanning line 51 are provided in the same layer parallel to each other. The region defined by two adjacent signal lines 50 and two adjacent storage capacitance lines 52 corresponds to a pixel region. A part of the storage capacitance line 52 faces via a gate insulating film 62 to a storage capacitance electrode 61 formed of polysilicon film. Thus, a storage capacitance is formed between the storage capacitance line 52 and the storage capacitance electrode 61.

A pixel electrode 53 is arranged such that peripheral portions thereof overlap the signal line 50 and the storage capacitance line 52. A thin film transistor (TFT) 75 functioning as a switching element is arranged near the intersection of the signal line 50 and the scanning line 51. The TFT 75 utilizes an N-channel lightly doped drain (Nch LDD element).

The TFT 75 has a drain electrode 66 and a source electrode 67 made of polysilicon film, and a gate electrode 63 which is a part of the scanning line 51 formed on the gate insulating film 62 interposed between the gate electrode and the source and drain electrodes. The drain electrode 66 is electrically connected to the signal line 50 via a contact hole 77. The source electrode 67 of the TFT 75, the pixel electrode 53 and the storage capacitance electrode 61 are electrically connected by a serial coupling line 80.

More specifically, the source electrode 67 is electrically connected to a first contact electrode 67C via a contact hole 78. The pixel electrode 53 is electrically connected to a second contact electrode 53C via contact holes 83A and 83B. The storage capacitance electrode 61 is electrically connected to a third contact electrode 61C via a contact hole 79.

The first contact electrode 67C and the second contact electrode 53C are electrically connected by a first coupling portion 80A of the coupling line 80. As a result, the first coupling portion 80A electrically connects the source electrode 67 and the pixel electrode 53.

The second contact electrode 53C and the third contact electrode 61C are electrically connected by a second coupling portion 80B of the coupling line 80. As a result, the second coupling portion 80B electrically connects the pixel electrode 53 and the storage capacitance electrode 61. The second coupling portion 80B is continuos to the first coupling portion 80A.

At least part of the second coupling portion 80B includes a wiring portion 80X which does not overlap the storage capacitance line 52 or the storage capacitance electrode 61. In other words, according to the first embodiment, as shown in FIGS. 1 to 3, the storage capacitance line 52 and the storage capacitance electrode 61 have openings 54A and 54B in regions corresponding to the wiring portion 80X. Thus, as shown in FIG. 3, when viewed from the rear surface of the array substrate 86, the wiring portion 80X is exposed through the opening 54 (A, B) from the storage capacitance line 52 and the storage capacitance electrode 61. A pillar spacer 55 for maintaining the distance between the array substrate 86 and the counter substrate 92 is provided in a portion corresponding to the opening 54 of the storage capacitance line 52 and the storage capacitance electrode 61, so that the contrast may not lower due to leakage of light.

With the above structure, when the second coupling portion 80B near the third contact electrode 61C is short-circuited with the storage capacitance line 52, or the storage capacitance line 52 is short-circuited with the storage capacitance electrode 61, a laser beam is radiated to cut the wiring portion 80X exposed through the other driving lines. As a result, the short circuit can be repaired without causing any damage to the other driving lines, such as the scanning lines or the signal lines.

A method for manufacturing the aforementioned active matrix liquid crystal display device according to the first embodiment will now be described with reference to FIGS. 1 to 3.

First, an amorphous silicon film (a-Si film) is deposited by the CVD or the like on a transparent insulating substrate 60, such as a high-distortion point glass substrate or a quartz substrate, to a thickness of about 50 nm. After annealing at 450° C. for an hour, an excimer laser beam is applied to the a-Si film, thereby making it to a polycrystalline silicon film. Thereafter, the polycrystalline silicon film, i.e., the polysilicon film, is patterned by photoetching, thereby forming channel layers of TFTs provided in the respective pixel regions of the display regions (pixel TFTs 75) and channel layers of TFTs provided in driving circuit regions (circuit TFTs 69 and 72). At the same time, storage capacitance electrodes 61 for forming storage capacitances and openings 54B are formed.

Subsequently, silicon oxide film $SiO_x$ is deposited on the overall surface of the substrate 60 by the CVD to a thickness of about 100 nm, thereby forming a gate insulating film 62.

Then, a single layer of tantalum (Ta), chromium (Cr), aluminum (Al), molybdenum (Mo), tungsten (W) or copper (Cu), or a laminated or alloy film of at least two of these metals is deposited on the overall surface of the gate insulating film 62 to a thickness of about 400 nm. The deposited film is patterned to a predetermined shape by photoetching. As a result, formed are scanning lines 51, storage capacitance lines 52 facing the storage capacitance electrodes 61 via the gate insulating film 62, gate electrodes 63 of the pixel TFTs 75 extended from the scanning lines 51, gate electrodes 64 and 65 of the circuit TFTs 69 and 72, and lines of the driving circuit regions. At this time, openings 54A are formed in the storage capacitance lines 52 in the same manner as forming the openings in the storage capacitance electrodes 61.

Thereafter, an impurity is injected into the polysilicon film by ion implantation or ion doping, using the gate electrodes 63, 64 and 65 as masks. As a result, formed are drain electrodes 66 and source electrodes 67 of the pixel TFTs 75, contact regions 68 of the storage capacitance electrodes 61, and source electrodes 70 and drain electrodes 71 of the N-ch circuit TFTS 69. In this embodiment, phosphorus ions of a high concentration are injected as an impurity in the condition of $PH_3/H_2$ at the accelerated voltage of 80 kev in the dosage of $5 \times 10^{15}$ atoms/cm$^2$.

The pixel TFTs 75 and the Nch circuit TFTs 69 in the driving circuit regions are coated with resist, so that an impurity may not be injected therein. Thereafter, an impurity is injected using the gate electrodes 64 of the Pch circuit TFTs as a mask. In this embodiment, boron ions of a high concentration are injected as an impurity in the condition of $B_2H_6/H_2$ at the accelerated voltage of 80 keV in the dosage of $5 \times 10^{15}$ atoms/cm$^2$.

Subsequently, in order to form Nch LDD regions in the pixel TFTs 75 and the circuit TFTs 69, an impurity is injected and the substrate as a whole is annealed to activate the impurity.

Then, silicon dioxide ($SiO_2$) film is deposited on the overall surface of the substrate 60 to a thickness of about 500 nm, thereby forming an interlayer insulating film 76.

Thereafter, the gate insulating film 62 and the interlayer insulating film 76 are etched by photoetching, thereby forming contact holes 77 extending to the drain electrodes 66 and contact holes 78 extending to the source electrodes 67 of the pixel TFTs 75, contact holes 79 extending to the contact regions 68 of the storage capacitance electrodes 61, and contact holes extending to the source electrodes 70 and 73 and to the drain electrodes 71 and 74 of the circuit TFTs 69 and 72.

Then, a single layer of Ta, Cr, Al, Mo, W or Cu, or a laminated or alloy film of at least two of these metals is deposited to a thickness of about 500 nm. The deposited film is patterned to a predetermined shape by photoetching.

As a result, signal lines 50 are formed, and the drain electrodes 66 of the pixel TFTs 75 are electrically connected to the signal lines 50. At the same time, formed are first contact electrodes 67C electrically connected to the source electrodes 67 of the pixel TFTs 75, second contact electrodes 53C to be electrically connected to pixel electrodes 53 (formed later) and third contact electrodes 61C electrically connected to the storage capacitance electrodes 61. Further, at the same time, first coupling portions 80A for electrically connecting the first contact electrodes 67C and the second contact electrodes 53C and second coupling portions 80B for electrically connecting the second contact electrodes 53C and the third contact electrodes 61C are formed, thereby forming a coupling line 80. Furthermore, at the same time, lines of the circuits TFTs 69 and 72 of the driving circuit regions are formed.

The first contact electrode 67C, the first coupling portion 80A, the second contact electrode 53C, the second coupling portion 80B and the second contact electrode 61C are all formed integrally, constituting the coupling line 80.

Then, silicon nitride ($SiN_x$) film is formed on the overall surface of the substrate 60, thereby forming a protective insulating film 82. The protective insulating film 82 is etched by photoetching, thereby forming contact holes 83A extending to the second contact electrodes 53C.

Thereafter, color layers 84R, 84G and 84B, in which red, green and blue pigments are respectively dispersed, are formed to a thickness of about 2 μm in each pixel region. Then, contact holes 83B extending from pixel electrodes 53 (described below) to the second contact electrodes 53C are formed.

Subsequently, a transparent conductive material, for example, indium tin oxide (ITO) is deposited by sputtering to the overall surface to a thickness of about 100 nm, and patterned to a predetermined shape by photoetching, thereby forming pixel electrodes 53. At the same time, the pixel electrodes 53 are electrically connected to the second contact electrodes 53C, and also to the source electrodes 67 of the pixel TFTs 75 via the first coupling portions 80A of the coupling lines 80.

Finally, an organic insulating film, in which, for example, black pigment is dispersed, is applied to the overall surface to a thickness of about 5 μm. The organic insulating film is etched by photoetching to form pillar spacers 55 so as to cover the openings 54.

The array substrate 86 of the active matrix liquid crystal display device is obtained through the process described above.

On the other hand, for example, an ITO film is formed by sputtering on a transparent insulating substrate, such as a glass substrate 90, and patterned to a predetermined shape, thereby forming a counter electrode 91.

The counter substrate 92 of the active matrix liquid crystal display device is obtained through the process described above.

Subsequently, a low-temperature curing polyimide is printed on the overall surface of the array substrate 86 on the side of the pixel electrodes 53 and the overall surface of the counter substrate 92 on the side of the counter electrode 91. The polyimide layers formed on the array substrate and the counter substrate are subjected to a rubbing process, so that the alignment axes of the two layers make an angle of 90° when the two substrates 86 and 92 face each other, thereby forming alignment films 85 and 93.

Then, the two substrates 86 and 92 are assembled to face each other to form a cell. Nematic liquid crystal 300 is injected through an opening into a gap between the substrates and sealed therein. Polarizing plates are adhered to the insulating substrates 60 and 90 of the substrates 86 and 92, thereby obtaining an active matrix liquid crystal display device.

In the array substrate 86 thus formed, the source electrodes 67 of the pixel TFTs 75 are coupled to the pixel electrodes 53 by the first coupling portions 80A of the coupling lines 80, and the pixel electrodes 53 are coupled to the storage capacitance electrodes 61 by the second coupling portions 80B of the coupling lines 80. Thus, the source electrodes 67 and the storage capacitance electrodes 61 are electrically connected to the pixel electrodes 53 by the independent coupling portions.

At least part of each second coupling portion 80B, connecting the pixel electrode 53 and the storage capacitance electrode 61, covers the region 54 where there is no other conductive film and no light-shielding film. In other words, the second coupling portion 80B is arranged such that at least part thereof passes above the opening 54 formed in the storage capacitance line 52 and the storage capacitance electrode 61, so as not to overlap the storage capacitance line 52 and the storage capacitance electrode 61 which have a light-shielding property and serve as conductive films. Thus, at least part of the second coupling portion 80B is exposed, when viewed from the rear surface of the array substrate 86.

Therefore, when a short circuit occurs between the storage capacitance line 52 and the storage capacitance electrode 61, constituting storage capacitance, a laser beam is radiated to the exposed part BOX of the second coupling portion BOB from the rear surface of the array substrate 86 to electrically cut the part 80X. Thereby, the storage capacitance line 52 is electrically cut from the storage capacitance electrode 61. In this way, the pixel defect can be improved to a half-lighted state, resulting in improvement of the yield.

At this time, since there is no conductive film above or below the cut portion, a short circuit with another electrode does not occur.

Further, since the light-shielding pillar spacer 55 is formed in a position of the array substrate 86 on the side facing the counter substrate so as to cover the opening 54, deterioration in the display quality due to reduction in contrast is prevented.

As a result, in the wiring BM structure, a short circuit between electrodes constituting a storage capacitance can be repaired without lowering the display quality.

According to the first embodiment described above, the pillar spacer 55 is formed to cover the opening 54 in the storage capacitance line 52 and the storage capacitance electrode 61. However, it is possible to shield the opening 54 from light by laminating two color layers 84G and 84B on the color layer 84R. In this case, the height of the laminated structure of three color layers is less than that of the pillar spacer 55. For this reason, if the pillar spacer 55 and the laminated color layer structure are arranged in combination, the laminated structure do not function as a spacer, but merely as a light-shielding portion. Thus, the spacer density in the display regions can be controlled freely by combining spacers and laminated structures.

In the first embodiment, the color layers 84 (R, G, B) are arranged on the array substrate. However, an organic insulating film may be used instead, in which case the same result can be obtained.

A structure of an array substrate, applied to an active matrix liquid crystal display device of a second embodiment, will now be described.

Figure 4:
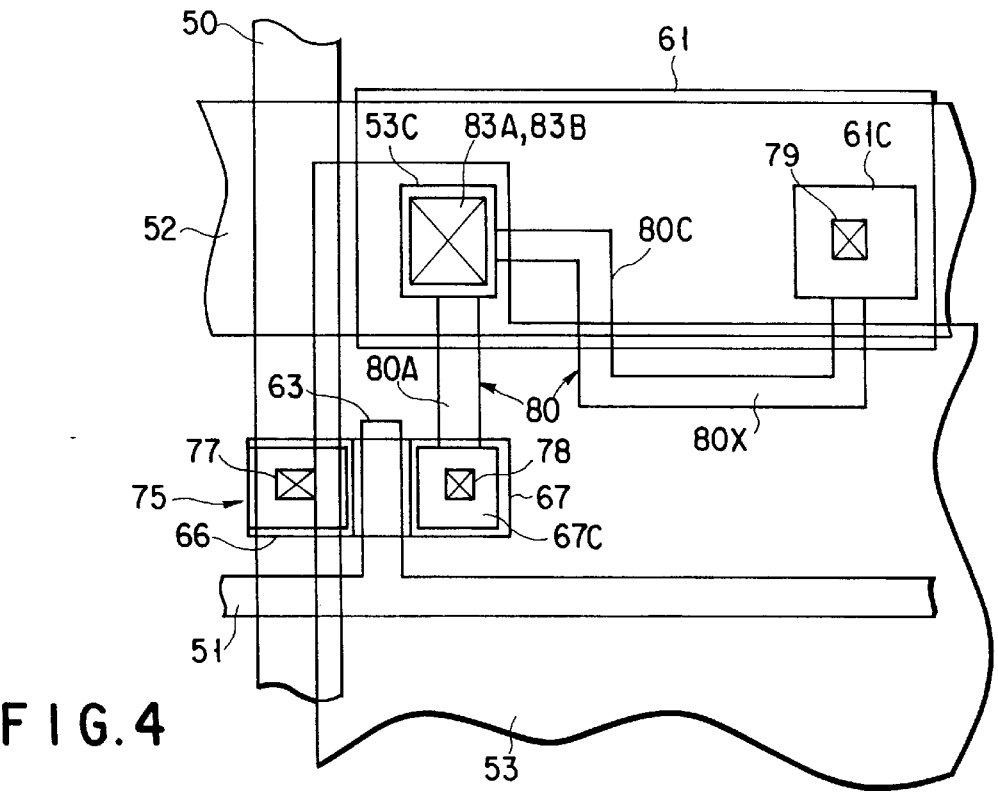
FIG. 4 is an enlarged plan view showing a region including a coupling line of an active matrix liquid crystal display device according to a second embodiment of the present invention.

FIG. 4 is an enlarged plan view showing a region including a coupling line of an active matrix liquid crystal display device according to a second embodiment of the present invention. In the following, the same elements as those of the first embodiment are identified by the same reference numerals as those, and detailed descriptions thereof are omitted.

As shown in FIG. 4, a first contact electrode 67C, electrically connected to a source electrode 67 of a TFT 75, and a second contact electrode 53C, electrically connected to a pixel electrode 53, are electrically connected by a first coupling portion 80A of a coupling line 80. The second contact electrode 53C, and a third contact electrode 61C electrically connected to a storage capacitance electrode 61, are electrically connected by a second coupling portion 80C of the coupling line 80.

At least part of the second coupling portion 80C includes a wiring portion 80X which does not overlap a storage capacitance line 52 or the storage capacitance electrode 61. In other words, according to the second embodiment, the wiring portion 80X of the second coupling portion 80C bypasses the storage capacitance line 52 and the storage capacitance electrode 61 on the array substrate so as not to overlap them. A transparent gate insulating film 62 and a transparent interlayer insulating film 76 are arranged under the wiring portion BOX. A transparent pixel electrode 53 is arranged above the wiring portion 80X.

As a result, when the array substrate and the counter substrate are assembled to form a cell, the wiring portion 80X is exposed, as viewed from the rear surface of the array substrate 86. Since the wiring portion 80X is arranged in the pixel region, a light-shielding pillar spacer as used in the first embodiment is not required.

With the structure described above, when a short circuit occurs between the storage capacitance line 52 and the second coupling portion 80C near the third contact electrode 61C, or between the storage capacitance line 52 and the storage capacitance electrode 61, a laser beam is radiated to the wiring portion 80X from the rear surface of the array substrate 86, thereby electrically cutting the wiring portion 80X. In this way, the short circuit can be repaired by cutting the wiring portion 80X of the coupling line 80.

In addition, since it is unnecessary to provide pillar spacers, the manufacturing cost is reduced.

A structure of an array substrate, applied to an active matrix liquid crystal display device of a third embodiment, will be described below.

Figure 5:
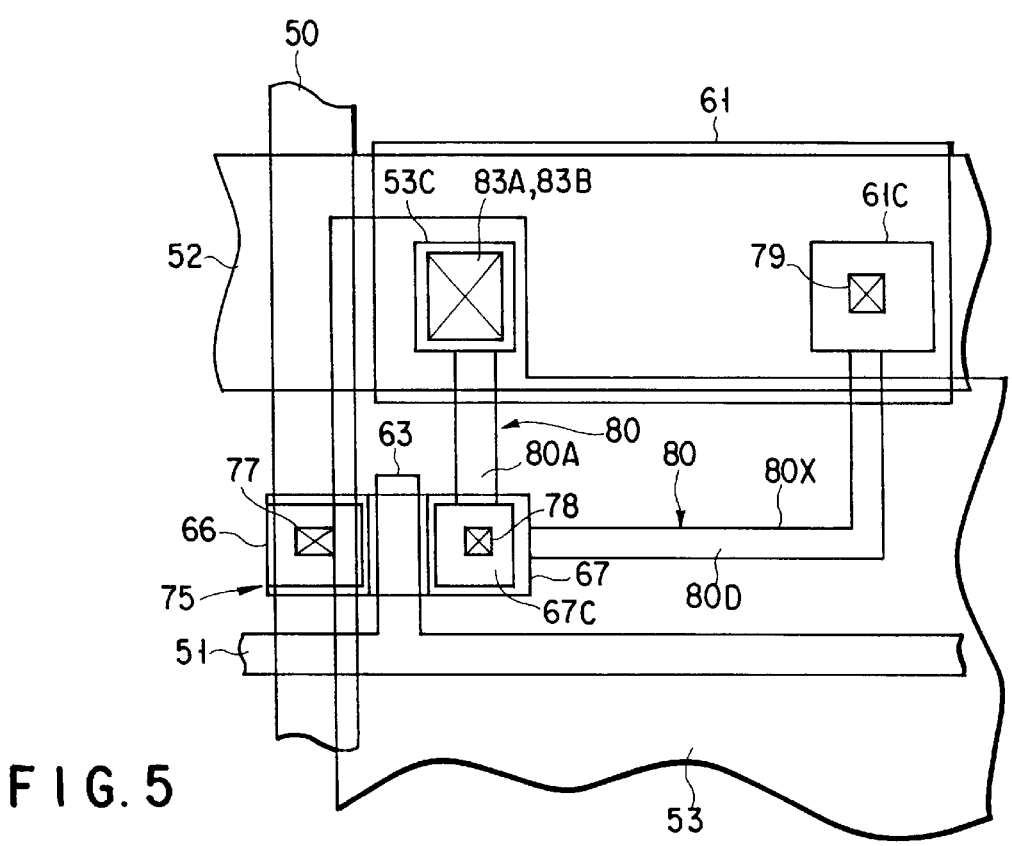
FIG. 5 is an enlarged plan view showing a region including a coupling line of an active matrix liquid crystal display device according to a third embodiment of the present invention.

FIG. 5 is an enlarged plan view showing a region including a coupling line of an active matrix liquid crystal display device according to a third embodiment of the present invention. In the following, the same elements as those of the first embodiment are identified by the same reference numerals as those, and detailed descriptions thereof are omitted.

As shown in FIG. 5, a first contact electrode 67C, electrically connected to a source electrode 67 of a TFT 75, and a second contact electrode 53C, electrically connected to a pixel electrode 53, are electrically connected by a first coupling portion BOA of a coupling line 80. The first contact electrode 67C, and a third contact electrode 61C electrically connected to a storage capacitance electrode 61, are electrically connected by a second coupling portion 80D of the coupling line 80.

At least part of the second coupling portion 80D includes a wiring portion 80X which does not overlap a storage capacitance line 52 or the storage capacitance electrode 61. In other words, according to the third embodiment, the wiring portion 80X of the second coupling portion 80D electrically connects the first contact electrode 67C and the third contact electrode 61C to bypass the storage capacitance line 52 and the storage capacitance electrode 61 on the array substrate so as not to overlap them. A transparent gate insulating film 62 and a transparent interlayer insulating film 76 are arranged under the wiring portion 80X. A transparent pixel electrode 53 is arranged above the wiring portion 80X.

As a result, when the array substrate and the counter substrate are assembled to face each other to form a cell, the wiring portion 80X is exposed as viewed from the rear surface of the array substrate 86. Since the wiring portion 80X is arranged in the pixel region, a light-shielding pillar spacer as used in the first embodiment is not required.

With the above structure, the same effects as those of the second embodiment can be obtained.

As described above, in the active matrix liquid crystal display device according to the first, second or third embodiment of the present invention, the coupling line 80 for connecting the source electrode 67 of the TFT 75, the pixel electrode 53 and the storage capacitance electrode 61 includes the wiring portion 80X which does not overlap either the storage capacitance line 52 or the storage capacitance electrode 61. In other words, the wiring portion 80X is exposed when viewed from the rear surface of the array substrate. Therefore, when a short circuit occurs between the storage capacitance line 52 and the coupling line 80 or the storage capacitance electrode 61, a laser beam is radiated to the wiring portion 80X. In this way, the pixel where a short circuit defect occurs can be improved to a half-lighted state. Therefore, it is possible to realize an active matrix liquid crystal display device in which a short circuit defect can be repaired without lowering the display quality.

A structure of an array substrate, applied to an active matrix liquid crystal display device of a fourth embodiment, will described.

FIG. 6 is an enlarged plan view showing a region including a coupling line of an active matrix liquid crystal display device according to a fourth embodiment of the present invention. FIG. 7 is a schematic cross-sectional view taken along the dot-chain line A-B-C in FIG. 6. In the following, the same elements as those of the third embodiment are identified by the same reference numerals as those, and detailed descriptions thereof are omitted.

In the structure where the pixel electrode 53 is formed above the insulating layer such as the color filters 84 as described above, an etching defect is liable to occur when a contact hole is formed in the insulating layer, since the insulating layer between the pixel electrode 53 and the TFT 75 is relatively thick. The etching defect causes a defect in contact between the pixel electrode 53 and the second contact electrode 53C, with the result that a signal output from the TFT 75 is not transmitted to the pixel electrode 53. For this reason, the pixel is fixed to a certain potential, resulting in a defective pixel which is always lighted.

To normalize the defective pixel, a laser beam may be radiated to the defective contact portion, to melt a part of the pixel electrode 53 and a part of the second contact electrode 53C, so that these electrodes can be short-circuited.

However, in the structure described above, since the storage capacitance line 52 and the storage capacitance electrode 61 are arranged under the second contact electrode 53C, the second contact electrode 53C is not exposed when viewed from the rear surface of the array substrate 86. Therefore, it is difficult to apply a laser beam to the defective portion from the rear surface of the array substrate 86.

To solve this problem, in the active matrix liquid crystal device of the fourth embodiment, the second contact electrode 53C is exposed from the other lines, as shown in FIGS. 6 and 7.

More specifically, the storage capacitance electrode 61 and the storage capacitance line 52 located under the second contact electrode 53C have openings 61H and 52H for transmitting a laser beam in a region which overlaps the second contact electrode. The opening 61H is formed by removing a part of the storage capacitance electrode 61 by an etching process. The opening 61H is, for example, an 8 μm square which has substantially the same median point as those of contact holes 83A and 83B. The opening 52H is formed by removing a part of the storage capacitance line 51 by an etching process. The opening 52H is, for example, a 6 μm square which has substantially the same median point as those of contact holes 83A and 83B.

In the structure described above, since the gate insulating film 62 and the interlayer insulating film 76 are transparent, the second contact electrode 53C is exposed from the other driving lines.

In the array structure having the above structure, when a contact defect occurs between the pixel electrode 53 and the second contact electrode 53C, a laser beam of the energy of about 2 mJ and the wavelength of 532 nm is radiated to the second contact electrode 53C through the openings 61H and 52H formed in the storage capacitance electrode 61 and the storage capacitance line 52 from the rear side of the array substrate 86. As a result, parts of the second contact electrode 53C and the pixel electrode 53 are melted.

The melted part of the second contact electrode 53C is short-circuited with the pixel electrode 53 through the contact holes 83A and 83B. Thus, the second contact electrode 53C and the pixel electrode 53 can be electrically connected to each other. As a result, the contact defect between the pixel electrode 53 and the second contact electrode 53C can be repaired without causing any damage to the other driving lines, such as a scanning line and a signal line.

As described above, according to the active matrix liquid crystal display device of the fourth embodiment of the present invention, the storage capacitance line 52 and the storage capacitance electrode 61 have openings which allow passage of a laser beam to a part of the region overlapping the second contact electrode 53C electrically connecting the pixel electrode 53 and the TFT 75. Therefore, even if a contact defect occurs in the second contact electrode 53C, the insulating layers can be eliminated by a laser beam radiated from the rear side of the array substrate 86. At the same time, parts of the pixel electrode and the second contact electrode can be melted to make a short circuit therebetween.

Consequently, the defective pixel having a display defect can be normalized, and the manufacturing yield can be improved.

A structure of an array substrate, applied to an active matrix liquid crystal display device of a fifth embodiment, will be described.

FIG. 8 is an enlarged plan view showing a region including a coupling line of an active matrix liquid crystal display device according to a fifth embodiment of the present invention. FIG. 9 is a schematic cross-sectional view taken along the dot-chain line A-B-C-D in FIG. 8. In the following, the same elements as those of the third embodiment are identified by the same reference numerals as those, and detailed descriptions thereof are omitted.

In the structure where the pixel electrode 53 is formed above the insulating layer such as the color filters 84 as described above, the distance between adjacent pixel electrodes can be smaller than in the case where the pixel electrodes are arranged in the same layer as a signal line, which is interposed between the pixel electrodes. Therefore, the improvement of the aperture ratio can be expected. However, since adjacent pixel electrodes are spaced at a small distance, they are liable to short-circuit with each other due to an etching defect which occurs in the process of forming the pixel electrodes. They are also liable to short-circuit even by a small metal chip. When the adjacent pixel electrodes short-circuit, they are fixed to a certain potential, resulting in defective pixels which are always lighted.

To normalize such defective pixels, a laser beam may be radiated onto the short-circuit portion to cut it. However, it is difficult to specify the short-circuit portion.

To solve this problem, in the active matrix liquid crystal display device of the fifth embodiment, as show in FIGS. 8 and 9, a polysilicon film P forming parts of a drain electrode 66 and a source electrode 67 includes a region which does not overlap the other metal lines between the contact with a signal line 50 and the contact with a pixel electrode 53.

More specifically, a TFT 75 uses a part of a scanning line 51 as a gate electrode 63. The TFT 75 comprises the drain electrode 66 formed in a region where the polysilicon film P contacts with the signal line 50, and the source electrode 67 formed in a second contact electrode 67C, i.e., a region where the polysilicon film P is electrically connected to the pixel electrode 53. As shown in FIG. 8, the polysilicon P bypasses under the gate electrode 63.

Since the polysilicon film P is thus routed, a part PA of the polysilicon film P is exposed without overlapping another metal line, as shown in FIG. 9.

In the array substrate having the above structure, for example, when the liquid crystal is driven by the potential difference of 4V, the voltage applied to the pixel electrodes to display black is 9V in the first frame and 1V in the second frame in the first column, whereas it is 1V in the first frame and 9V in the second frame in the second column. At this time, the voltage applied to the counter electrode is 5V.

If adjacent pixel electrodes 53 in the first and second columns are short-circuited, the TFT in the first column applies a voltage of 9V to the pixel electrode of the first column through the signal line, while the TFT in the second column applies a voltage of 1V to the pixel electrode of the second column through the signal line. Since the two pixel electrodes are short-circuited, the applied voltages are averaged. Therefore, a voltage of 5V is applied to these pixel electrodes. As a result, there is no potential difference between the counter electrode and the two pixel electrodes, resulting in bright points (white display).

At this time, a laser beam of the energy of about 2 mJ and the wavelength of 532 nm is radiated from the rear side of the array substrate 86 to the exposed part PA of the polysilicon film P constituting the TFT in the second column. The polysilicon film P has a thickness of about 50 nm to 70 nm and absorbs a wavelength near 500 nm at a high ratio. For this reason, the exposed part PA of the polysilicon film P is eliminated and cut by the thermal energy of the radiated laser beam. At this time, ionic contaminants are not generated from the eliminated material.

In general, the diameter of a laser spot for use in laser repair is several microns. Therefore, the length of the exposed part PA is set to about several microns to 10 μm in consideration of the margin of optical alignment, so that a desired portion can be cut by the laser without causing damages to another driving line.

Thus, the signal line for supplying a driving signal to the TFTs of the second column is electrically insulated from the pixel electrodes of the second column. As a result, the driving voltage supplied to the TFTS of the second column through the signal line is not applied to the pixel electrodes of the second column. In other words, the pixel electrodes in the first and second columns are driven by the driving signal supplied from the TFTs of the first column. Thus, at least the pixel electrodes of the first column are normally operated, thereby reducing the degree of defectiveness of the display.

As described above, in the active matrix liquid crystal display device of the fifth embodiment, the polysilicon film P forming the TFT 75 includes a region which does not overlap the other metal lines between the contact with the signal line 50 and the contact with the pixel electrode 53. Therefore, even if adjacent pixel electrodes are short-circuited, a laser beam can be applied to and cut the polysilicon film P from the rear side of the array substrate.

As a result, at least one of the defective pixel electrodes is normalized, thereby lowering the defectiveness of the display and improving the manufacturing yield.

A structure of an array substrate, applied to an active matrix liquid crystal display device of a sixth embodiment, will described.

Figure 10:
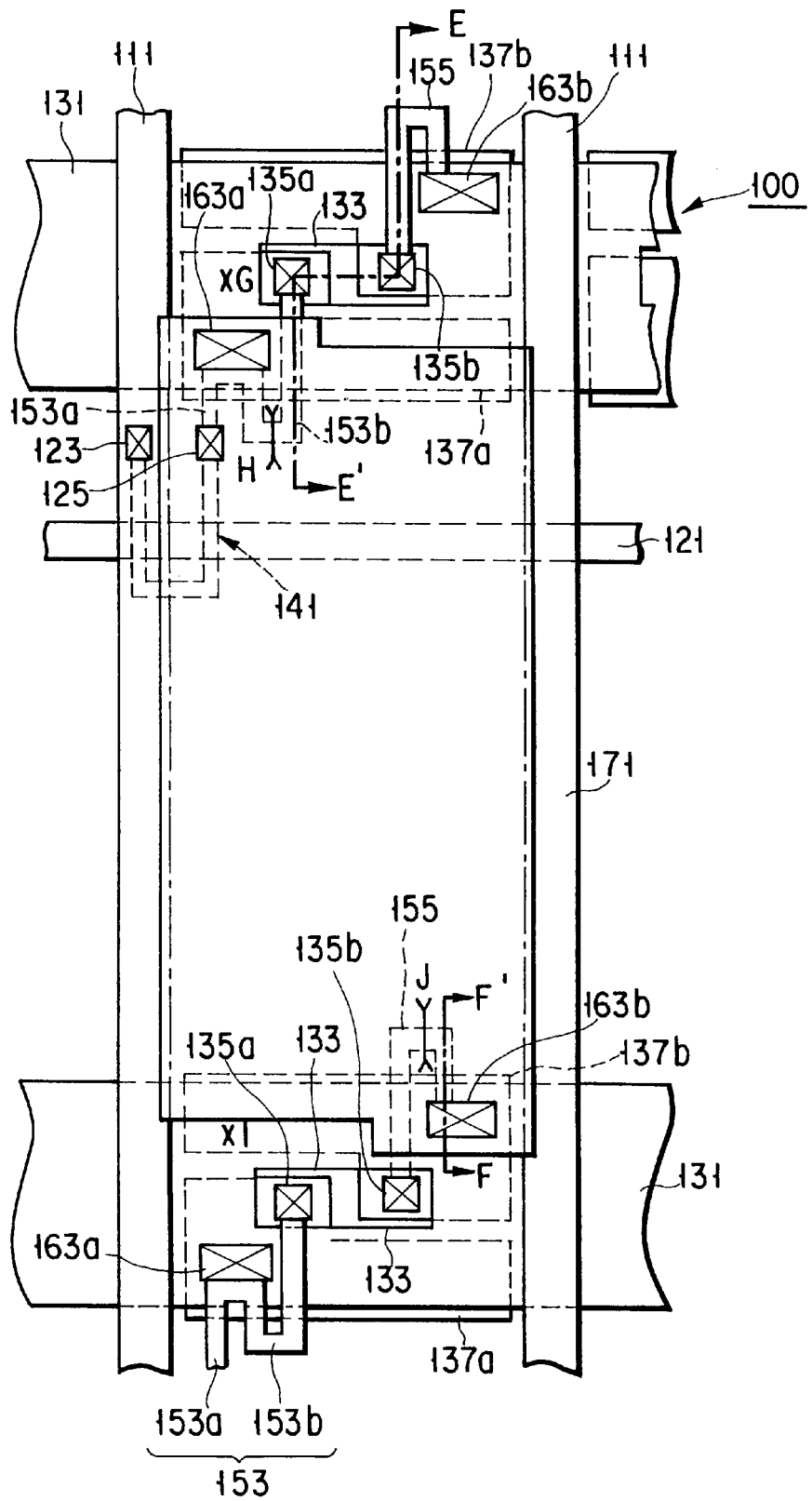
FIG. 10 is an enlarged plan view showing a region including a coupling line of an active matrix liquid crystal display device according to a sixth embodiment of the present invention.

FIG. 10 is a plan view showing a region including a coupling line of an active matrix liquid crystal display device according to a sixth embodiment of the present invention. FIG. 11 is a schematic cross-sectional view taken along the line E–E' in FIG. 10, and FIG. 12 is a schematic cross-sectional view taken along the line F–F' in FIG. 10.

The liquid crystal display device of this embodiment comprises an array substrate 100, a counter substrate 200, and a TN (twisted nematic) liquid crystal layer 300, serving as an optical modulation layer, held between these substrates via alignment films 311 and 313. Further, polarizing plates 321 and 323 are attached to the outer surfaces of the substrates 100 and 200.

The array substrate 100 has spacers 331 made of resin and formed integral with the array substrate 100, to maintain the thickness of the liquid crystal layer 300. The counter substrate 200 has a substantially striped light-shielding film 211 formed on a glass substrate 201, and a counter electrode 221 made of ITO and arranged on the light-shielding film. The light-shielding film 211 shields from light TFTs 141 and the space between scanning lines 121 and storage capacitance lines 131 on the array substrate 100.

Unlike in the above embodiments, the array substrate 100 of this embodiment is characterized in that each pixel has at least two independent storage capacitances Cs1, Cs2, ..., which can be individually repaired.

The first storage capacitance Cs1 is formed between a storage capacitance line 131 and a first lower electrode 137a made of polysilicon thin film and located under the storage capacitance line 131 via a gate insulating film 145.

The polysilicon film located on a glass substrate 101 forms source and drain regions of the TFT 141, first and second lower electrodes 137a and 137b, etc.

The drain region of the TFT 141 is connected to a signal line 111 via a contact hole 123 extending through the gate insulating film 145 and an interlayer insulating film 147. The source region of the TFT 141 is electrically connected to a first wiring portion 153a of a first connecting line 153 formed in the step of forming the signal line 111 via a contact hole 125 extending through the gate insulating film 145 and the interlayer insulating film 147. The first wiring portion 153a is electrically connected to a pixel electrode 171 via a contact hole 163a extending through a smoothing layer 161.

A second wiring portion 153b continuous to the first wiring portion 153a extends through the gap between the scanning line 121 and the storage capacitance line 131 and again on the storage capacitance line 131. Further, it is electrically connected to the first lower electrode 137a made of polysilicon thin film through a contact hole 135a extending through the gate insulating film 145 and the interlayer insulating film 147 in an opening 133 in the storage capacitance line 131.

As a result, the first storage capacitance Cs1 is formed between the storage capacitance line 131 and the first lower electrode 137a made of polysilicon thin film and electrically connected to the source region of the TFT 141.

The second storage capacitance Cs2 is formed between the storage capacitance line 131 and a second lower electrode 137b made of polysilicon thin film and located under an adjacent storage capacitance line 131 via a gate insulating film 145.

The second lower electrode 137b made of polysilicon thin film is electrically connected to a second connecting line 155 formed in the step of forming the signal line 111 via a contact hole 135b extending through the gate insulating film 145 and the interlayer insulating film 147 in the opening 133 in the storage capacitance line 131. The second connecting line 155 extends from another storage capacitance line 131 to an inner portion of the pixel electrode 171 through a light transmitting region of the array substrate 100 and again on the storage capacitance line 131. Further, it is electrically connected to the pixel electrode 171 through a contact hole 163b extending through the smoothing layer 161.

As a result, the second storage capacitance Cs2 is formed between the storage capacitance line 131 and the second lower electrode 137b made of polysilicon thin film and electrically connected to the pixel electrode 171.

For example, after the array substrate 100 is formed, predetermined voltages Vcs1 and Vcs2 are applied to the storage capacitance line 131 (different voltages Vcs1 and Vcs2 are respectively applied to adjacent storage capacitance lines). Thereafter, a predetermined voltage Vs, different from the voltages Vcs1 and Vcs2, is applied to the signal line 111 and a scanning pulse Vg is sequentially applied to the scanning lines 121, thereby writing the voltage Vs in the respective pixel electrodes 171. Then, the scanning pulse Vg is sequentially applied to the scanning lines 121 again, thereby reading the electrical charges from the pixel electrodes 171 through the signal line 111. At this time, if the storage capacitance line 131 is short-circuited with the lower electrode 137, the voltage Vcs1 or Vcs2 is read through the signal line 131. Thus, the position where the storage capacitance line 131 and the lower electrode 137 are short-circuited can be specified.

For example, when a short circuit XG as shown in FIG. 10 is detected, a laser beam is radiated from the rear side of the array substrate 100 to cut a portion H of the second wiring portion 153b of the connecting line 153 in the light transmitting region of the array substrate 100. Therefore, the pixel electrode is not fixed to the potential of the storage capacitance line 131, so that an undesirable display state can be prevented. In this case, since the storage capacitance Cs2 remains in the repaired pixel, the change in the potential of the pixel electrode, due to the influence of parasitic capacitance, is suppressed. As a result, a satisfactory display quality is maintained.

In the same manner, for example, when a short circuit XI as shown in FIG. 10 is detected, a laser beam is radiated from the rear side of the array substrate 100 to cut a portion J of the connecting line 155. Therefore, the pixel electrode is not fixed to the potential of the storage capacitance line 131, so that an undesirable display state can be prevented. In this case also, since the storage capacitance Cs2 remains in the repaired pixel, the change in the potential of the pixel electrode, due to the influence of parasitic capacitance, is suppressed. As a result, a satisfactory display quality is maintained.

If both the first and second storage capacitances Cs1 and Cs2 are short-circuited, the pixel electrodes can be repaired by cutting the lines 153b and 155 at the aforementioned portions H and J.

A structure of an array substrate, applied to an active matrix liquid crystal display device of a seventh embodiment, will be described.

Figure 13:
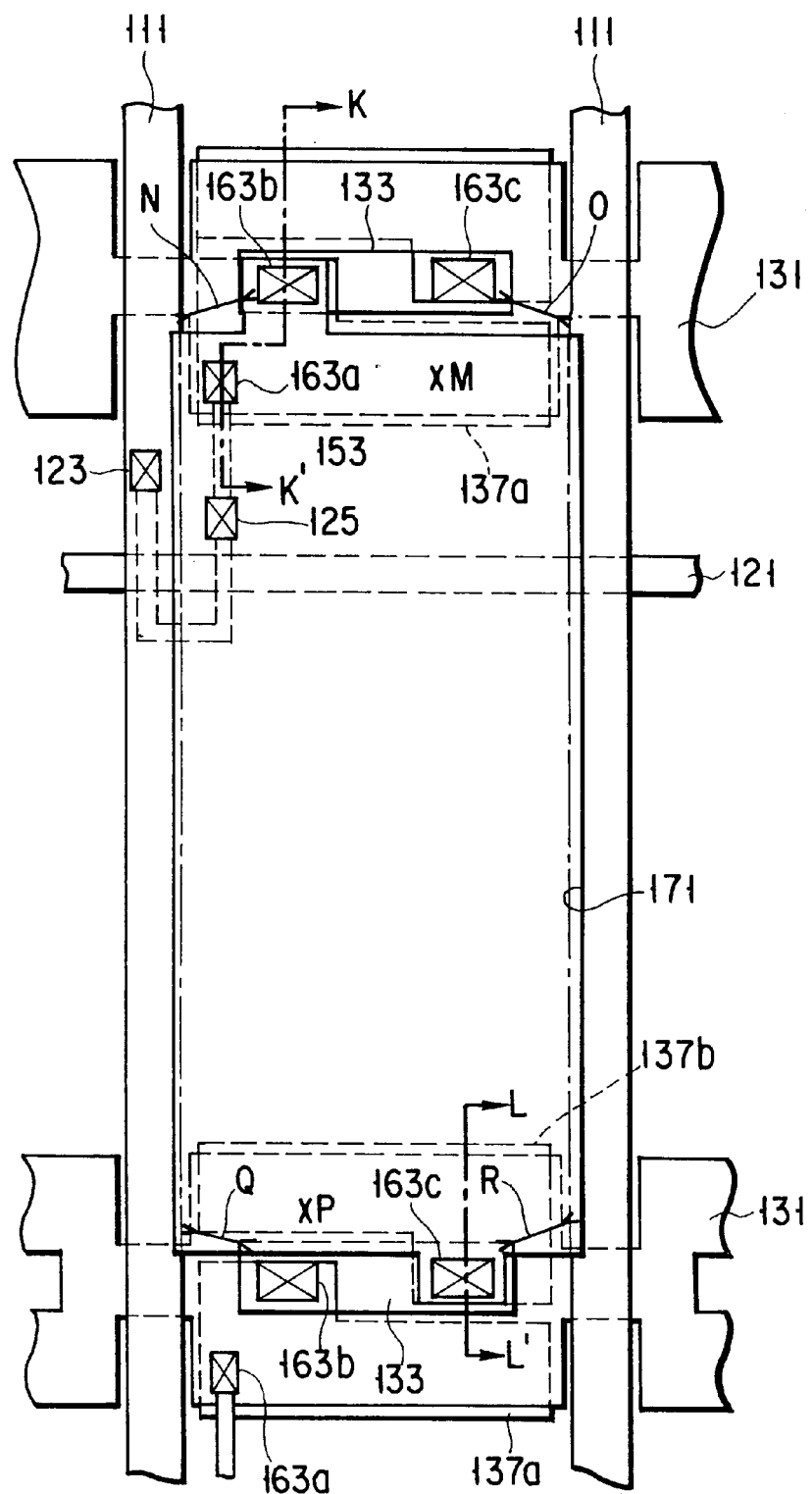
FIG. 13 is an enlarged plan view showing a region including a coupling line of an active matrix liquid crystal display device according to a seventh embodiment of the present invention.
Figure 14:
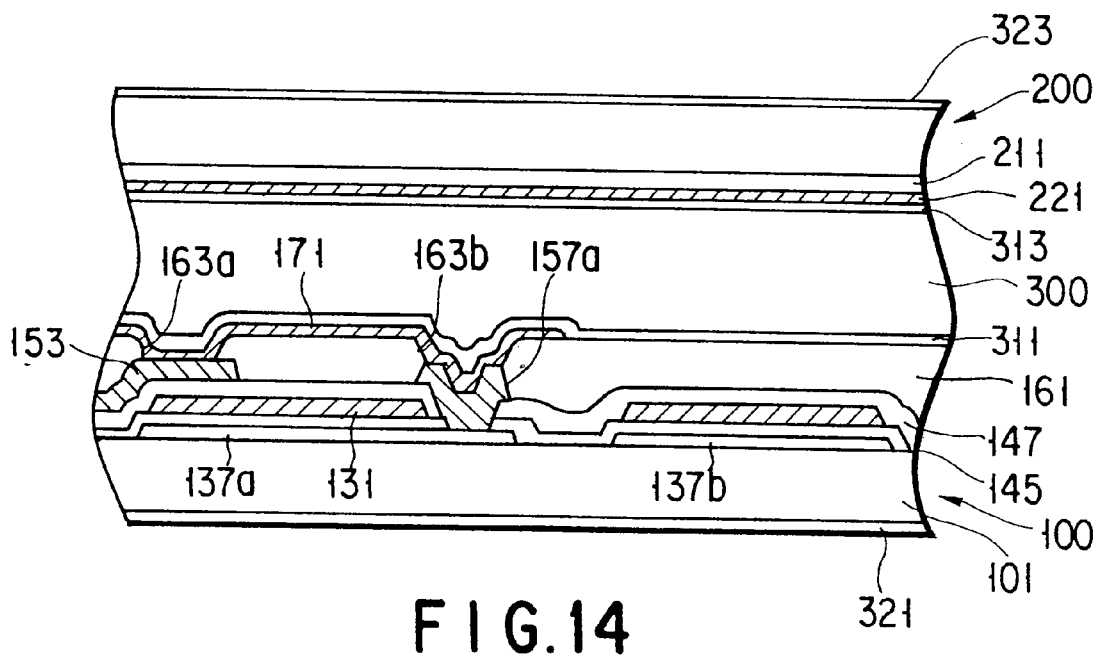
FIG. 14 is a schematic cross-sectional view taken along the line K–K' in FIG. 13.
Figure 15:
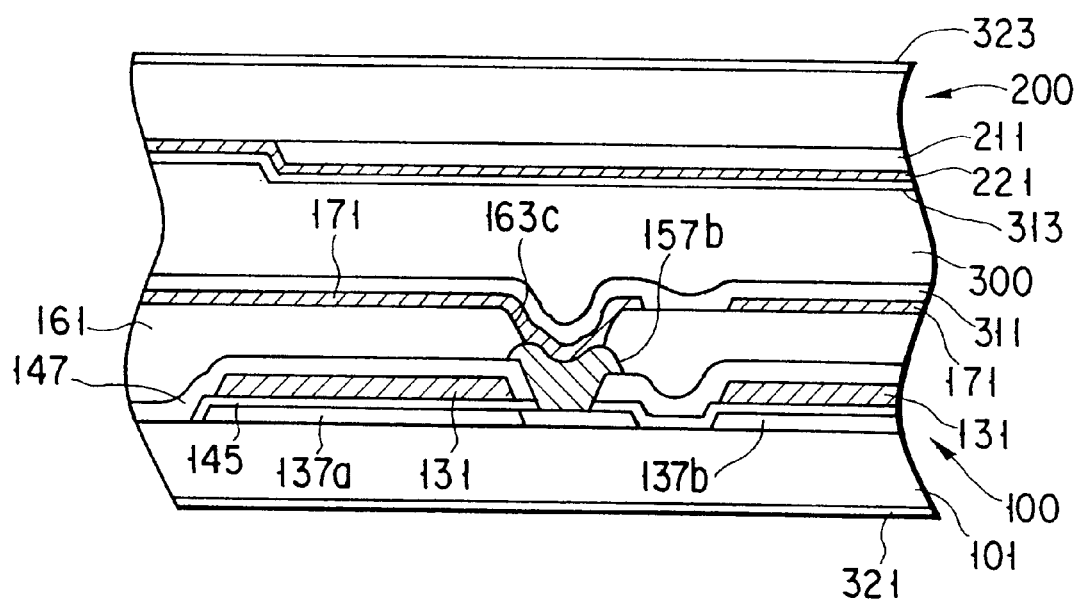
FIG. 15 is a schematic cross-sectional view taken along the line L–L' in FIG. 13.

FIG. 13 is a plan view showing a region including a coupling line of an active matrix liquid crystal display device according to a seventh embodiment of the present invention. FIG. 14 is a schematic cross-sectional view taken along the line K–K' in FIG. 13, and FIG. 15 is a schematic cross-sectional view taken along the line L–L' in FIG. 13. In the following, the same elements as those of the sixth embodiment are identified by the same reference numerals as those, and detailed descriptions thereof are omitted.

Like the sixth embodiment described above, the array substrate 100 of this embodiment is characterized in that each pixel has two independent storage capacitances Cs1 and Cs2, which can be individually repaired. The forms of the storage capacitances Cs1 and Cs2 are different from those of the sixth embodiment.

The first storage capacitance Cs1 is formed between a storage capacitance line 131 and a first lower electrode 137a made of polysilicon thin film and located under the storage capacitance line 131 via a gate insulating film 145, as in the sixth embodiment.

The source region of a TFT 141 is electrically connected to a connecting line 153 formed in the step of forming a signal line 111 via a contact hole 125 extending through the gate insulating film 145 and an interlayer insulating film 147. The connecting line 3 is electrically connected to a pixel.electrode 171 through a contact hole 163a extending through a smoothing layer 161. The pixel electrode 171 extends to an opening 133 of the storage capacitance line 131. The pixel electrode 171 is electrically connected to a first lower electrode 137a made of polysilicon thin film through a contact portion 157a formed in the step of forming the signal lines 111, via a contact hole 163b extending through the smoothing layer 161, the gate insulating film 145 and the interlayer insulating film 147 in the opening 133.

As a result, the first storage capacitance Cs1 is formed between the storage capacitance line 131 and the first lower electrode 137a made of polysilicon thin film and electrically connected to the source region of the TFT 141.

The second storage capacitance Cs2 is formed between the storage capacitance line 131 and a second lower electrode 137b made of polysilicon thin film and located under an adjacent storage capacitance line 131 via the gate insulating film 145.

The second lower electrode 137b made of polysilicon thin film is electrically connected to the pixel electrode 171 through a contact portion 157b formed in the step of forming the signal line 111 via a contact hole 135b extending through the smoothing layer 161, the gate insulating film 145 and the interlayer insulating film 147 in an opening 130 in the adjacent storage capacitance line 131.

As a result, the second storage capacitance Cs2 is formed between the storage capacitance line 131 and the second lower electrode 137b made of polysilicon thin film and electrically connected to the pixel electrode 171.

In other words, according to this embodiment, the storage capacitance line 131 is formed of branch portions corresponding to the adjacent first and second lower electrodes 137a and 137b and a portion connecting these branch portions.

The branch portions respectively overlay the first and second lower electrodes 137a and 137b to form storage capacitances and to be partially exposed through the other lines.

As in the sixth embodiment, for example, after the array substrate 100 is formed, predetermined voltages Vcs1 and Vcs2 are applied to the storage capacitance line 131 (different voltages Vcs1 and Vcs2 are respectively applied to adjacent storage capacitance lines). Thereafter, a predetermined voltage Vs, different from the voltages Vcs1 and Vcs2, is applied to the signal line 111 and a scanning pulse Vg is sequentially applied to the scanning lines 121, thereby writing the voltage Vs in the respective pixel electrodes 171. Then, the scanning pulse Vg is sequentially applied to the scanning lines 121 again, thereby reading the electrical charges from the pixel electrodes 171 through the signal line 111. At this time, if the storage capacitance line 131 is short-circuited with the lower electrodes 137a and 137b, the voltage Vcs1 or Vcs2 is read through the signal line 111. Thus, the position where the storage capacitance line 131 is short-circuited with the lower electrodes 137a and 137b can be specified.

For example, when a short circuit XM as shown in FIG. 13 is detected, a laser beam is radiated from the rear side of the array substrate 100 to cut portions N and O of the storage capacitance line 131. The portions N and O correspond to the branch portions which are exposed through the other lines. Therefore, the pixel electrode is not fixed to the potential of the storage capacitance line 131, so that an undesirable display state can be prevented. In this case, since the storage capacitance Cs2 remains in the repaired pixel, the change in the potential of the pixel electrode, due to the influence of parasitic capacitance, is suppressed. As a result, a satisfactory display quality is maintained.

In the same manner, for example, when a short circuit XP as shown in FIG. 10 is detected, a laser beam is radiated from the rear side of the array substrate 100 to cut portions Q and R of the storage capacitance line 131. The portions Q and R correspond to the branch portions which are exposed through the other lines. Therefore, the pixel electrode is not fixed to the potential of the storage capacitance line 131, so that an undesirable display state can be prevented. In this case also, since the storage capacitance Cs2 remains in the repaired pixel, the change in the potential of the pixel electrode, due to the influence of parasitic capacitance, is suppressed. As a result, a satisfactory display quality is maintained.

If both the first and second storage capacitances Cs1 and Cs2 are short-circuited, the pixel electrodes can be repaired by cutting the storage capacitance line 131 at the aforementioned portions N, O, Q and R.

In all the embodiments described above, the storage capacitance Cs is formed between the storage capacitance line and the lower electrode made of polysilicon thin film, which are independent of each other. However, the scanning line 121 itself can be used as a storage capacitance line.

Further, all the embodiments described above relate to an active matrix liquid crystal display device in which polysilicon film is used as semiconductor layers of TFTs.

However, the present invention can be applied to an active matrix liquid crystal device in which another semiconductor layer, such as amorphous silicon film, is used as semiconductor layers.

As has been described above, according to the present invention, it is possible to provide an active matrix liquid crystal display device using a wiring BM structure, in which a short circuit between electrodes forming a storage capacitance can be repaired without lowering the display quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An active matrix liquid crystal display device comprising:

an array substrate including: a scanning line; a signal line crossing the scanning line; a switching element located at an intersection between the scanning line and the signal line and electrically connected to the signal line; a pixel electrode electrically connected to the switching element through a first coupling line; a storage capacitance electrode electrically connected to one of the switching element and the pixel electrode through a second coupling line; and a storage capacitance signal line facing the storage capacitance electrode via an insulating layer; and a counter substrate having a counter electrode which faces the pixel electrode with a liquid crystal composition inserted therebetween, wherein the second coupling line includes a portion which is exposed through the storage capacitance signal line.

2. An active matrix liquid crystal display device according to claim 1, wherein the storage capacitance signal line has an opening through which the second coupling line is exposed.

3. An active matrix liquid crystal display device according to claim 2, wherein the storage capacitance electrode has an-opening through which the second coupling line is exposed.

4. An active matrix liquid crystal display device according to claim 3, further comprising a light-shielding member arranged between the array substrate and the counter substrate so as to shield the opening.

5. An active matrix liquid crystal display device according to claim 1, wherein the storage capacitance signal line has a portion which overlaps a connecting portion between the pixel electrode and the first coupling line.

6. An active matrix liquid crystal display device according to claim 1, wherein the storage capacitance signal line has an opening which exposes a connecting portion between the pixel electrode and the first coupling line.

* * * * *